(12) United States Patent
Beverly et al.

(10) Patent No.: US 7,496,690 B2
(45) Date of Patent: Feb. 24, 2009

(54) METHOD, SYSTEM, AND PROGRAM FOR MANAGING MEMORY FOR DATA TRANSMISSION THROUGH A NETWORK

(75) Inventors: Harlan T. Beverly, McDade, TX (US); Christopher T. Foulds, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 801 days.

(21) Appl. No.: 10/683,941

(22) Filed: Oct. 9, 2003

(65) Prior Publication Data

US 2005/0080928 A1     Apr. 14, 2005

(51) Int. Cl.
    *G06F 15/16*     (2006.01)
(52) U.S. Cl. ................. 709/250; 709/214; 709/215
(58) Field of Classification Search .......... 710/13, 710/22, 308; 711/202, 206–207; 709/201–203, 709/212–216
See application file for complete search history.

(56) References Cited

U.S. PATENT DOCUMENTS

| | | | | |
|---|---|---|---|---|
| 5,175,852 A * | 12/1992 | Johnson et al. | ............... | 707/8 |
| 5,696,926 A * | 12/1997 | Culbert et al. | ............... | 711/203 |
| 5,802,554 A * | 9/1998 | Caceres et al. | ............... | 711/103 |
| 5,966,733 A * | 10/1999 | Brewer | ............... | 711/170 |
| 6,266,753 B1 * | 7/2001 | Hicok et al. | ............... | 711/202 |
| 6,269,431 B1 * | 7/2001 | Dunham | ............... | 711/162 |
| 6,360,220 B1 * | 3/2002 | Forin | ............... | 707/8 |
| 6,487,561 B1 * | 11/2002 | Ofek et al. | ............... | 707/204 |
| 6,751,583 B1 * | 6/2004 | Clarke et al. | ............... | 703/17 |
| 6,920,537 B2 * | 7/2005 | Ofek et al. | ............... | 711/163 |
| 6,948,039 B2 * | 9/2005 | Biessener et al. | ........... | 711/162 |
| 2001/0037419 A1 * | 11/2001 | Hagersten | ............... | 710/50 |
| 2004/0162930 A1 * | 8/2004 | Forin et al. | ............... | 711/1 |
| 2004/0174814 A1 * | 9/2004 | Futral | ............... | 370/231 |
| 2004/0249973 A1 * | 12/2004 | Alkhatib et al. | ............ | 709/245 |
| 2004/0249974 A1 * | 12/2004 | Alkhatib et al. | ............ | 709/245 |
| 2005/0015685 A1 * | 1/2005 | Yamamoto | ............... | 714/54 |
| 2005/0144402 A1 | 6/2005 | Beverly | | |
| 2005/0216597 A1 | 9/2005 | Shah et al. | | |
| 2006/0004795 A1 | 1/2006 | Shah et al. | | |
| 2006/0004941 A1 | 1/2006 | Shah et al. | | |
| 2006/0004983 A1 | 1/2006 | Tsao et al. | | |
| 2006/0136697 A1 | 6/2006 | Tsao et al. | | |
| 2006/0146814 A1 | 7/2006 | Shah et al. | | |

(Continued)

OTHER PUBLICATIONS

RFC 791, Darpa Inernet Program, Protocol Specification Sep. 1981. Prepared for: Defense Advanced Research Projects Institute.*

(Continued)

*Primary Examiner*—Bunjob Jaroenchonwanit
*Assistant Examiner*—Tauqir Hussain
(74) *Attorney, Agent, or Firm*—Konrad Raynes & Victor LLP

(57) ABSTRACT

Provided are a method, system, and program for managing memory for data transmission through a network. Virtual memory addresses of the data to be sent are provided to a sending agent. The sending agent provides to a host the virtual addresses of requested data. In response, the requested data addressed by the virtual addresses or the physical memory locations of the requested data are provided to the sending agent for sending to a destination.

21 Claims, 10 Drawing Sheets

U.S. PATENT DOCUMENTS

2006/0149919 A1 7/2006 Arizpe et al.
2007/0005927 A1* 1/2007 Khosravi et al. ............ 711/173

OTHER PUBLICATIONS

Postel, J., ed. "Internet Protocol DARPA Internet Program Protocol Specification," Information Sciences Institute, Sep. 1981; 51 pp.

Postel, J., ed. "Transmission Control Protocol DARPA Internet Program Protocol Specification," Information Sciences Institute, Sep. 1981; 89 pp.

Wright, G.R., and W. R. Stevens, *TCP/IP Illustrated, vol. 2: The Implementation*, 1995, Addison-Wesley, Boston, 1174 pp.

Chinese Office Action issued Sep. 5, 2008 for counterpart U.S. Appl. No. 200410077181.4, filed Sep. 9, 2004, 9 pp.

\* cited by examiner

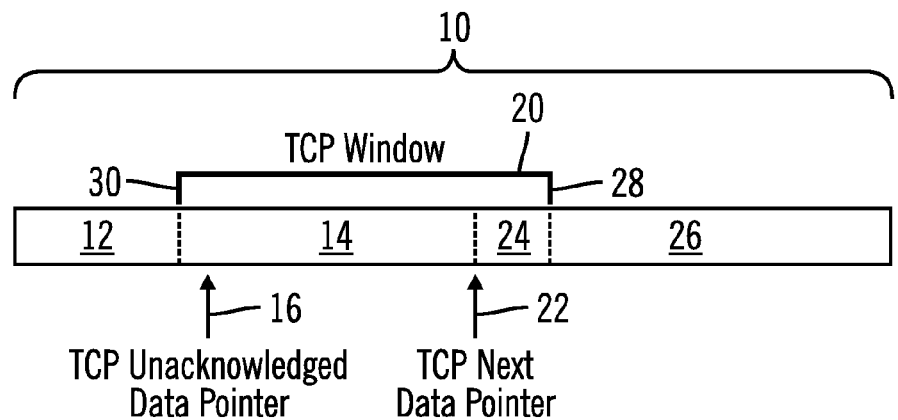
FIG. 1
PRIOR ART
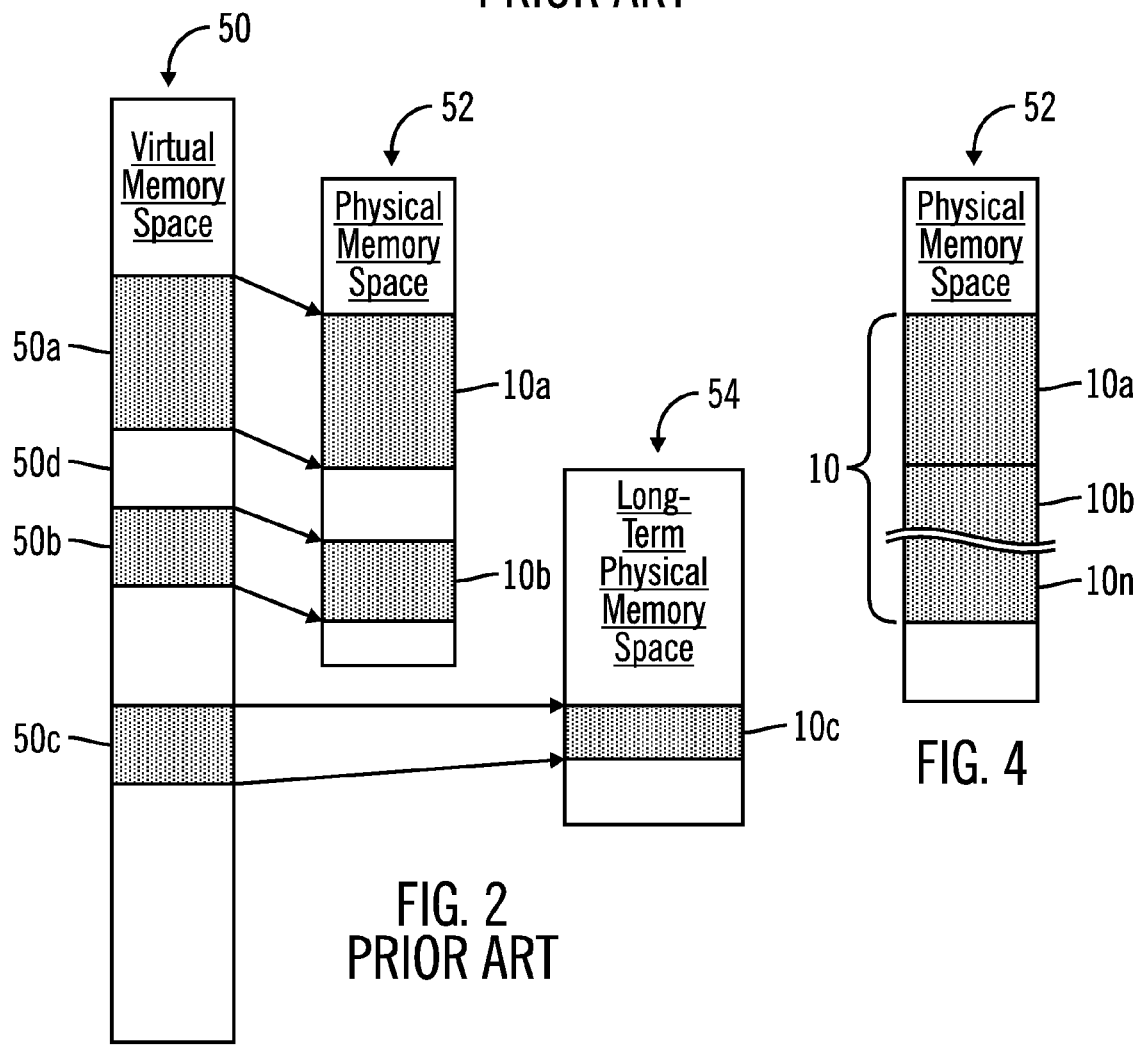
FIG. 2
PRIOR ART
FIG. 4

METHOD, SYSTEM, AND PROGRAM FOR MANAGING MEMORY FOR DATA TRANSMISSION THROUGH A NETWORK

BACKGROUND OF THE INVENTION

1. Field of the Invention

The present invention relates to a method, system, and program for managing memory for data transmission through a network.

2. Description of the Related Art

In a network environment, a network adaptor on a host computer, such as an Ethernet controller, Fibre Channel controller, etc., will receive Input/Output (I/O) requests or responses to I/O requests initiated from the host. Often, the host computer operating system includes a device driver to communicate with the network adaptor hardware to manage I/O requests to transmit over a network. The host computer further includes a transport protocol driver which packages data to be transmitted over the network into packets, each of which contains a destination address as well as a portion of the data to be transmitted. Data packets received at the network adaptor are often stored in an available allocated packet buffer in the host memory. The transport protocol driver processes the packets received by the network adaptor that are stored in the packet buffer, and accesses any I/O commands or data embedded in the packet.

For instance, the transport protocol driver may implement the Transmission Control Protocol (TCP) and Internet Protocol (IP) to encode and address data for transmission, and to decode and access the payload data in the TCP/IP packets received at the network adaptor. IP specifies the format of packets, also called datagrams, and the addressing scheme. TCP is a higher level protocol which establishes a connection between a destination and a source.

A device driver can utilize significant host processor resources to handle network transmission requests to the network adaptor. One technique to reduce the load on the host processor is the use of a TCP/IP Offload Engine (TOE) in which TCP/IP protocol related operations are implemented in the network adaptor hardware as opposed to the device driver, thereby saving the host processor from having to perform some or all of the TCP/IP protocol related operations. The transport protocol operations include packaging data in a TCP/IP packet with a checksum and other information and sending the packets. These sending operations are performed by a sending agent which may be implemented with a TOE, a network interface card or integrated circuit, a driver, TCP/IP stack, a host processor or a combination of these elements. The transport protocol operations also include receiving a TCP/IP packet from over the network and unpacking the TCP/IP packet to access the payload or data. These receiving operations are performed by a receiving agent which, again, may be implemented with a TOE, a driver, a host processor or a combination of these elements.

FIG. 1 illustrates a stream 10 of TCP/IP packets which are being sent by a sending agent of a source host to a destination host in a TCP connection. In the TCP protocol as specified in the industry accepted TCP RFC (request for comment), each packet is assigned a unique sequence number. As each packet is successfully sent to the destination host, an acknowledgment is sent by the destination host to the source host, notifying the source host by packet sequence number of the successful receipt of that packet. Accordingly, the stream 10 includes a portion 12 of packets which have been both sent and acknowledged as received by the destination host. The stream 10 further includes a portion 14 of packets which have been sent by the source host but have not yet been acknowledged as received by the destination host. The sending agent maintains a TCP Unacknowledged Data Pointer 16 which points to the sequence number of the first unacknowledged sent packet.

The capacity of the packet buffer used to store data packets received at the destination host is generally limited in size. In accordance with the TCP protocol, the destination host advertises how much buffer space it has available by sending a value referred to herein as a TCP Window indicated at 20 in FIG. 1. Accordingly, the source host sending agent uses the TCP Window value to limit the number of outstanding packets sent to the destination host, that is, the number of sent packets for which the source host has not yet received an acknowledgment. A TCP Next Data Pointer 22 points to the sequence number of the next packet to be sent to the destination host. A portion 24 of the datastream 10 between the TCP Next Data Pointer 22 and the end of the TCP Window 20 represents packets which have not yet been sent but are permitted to be sent under the TCP protocol without waiting for any additional acknowledgments because these packets are still within the TCP Window 20 as shown in FIG. 1. A portion 26 of the datastream 10 which is outside the end boundary 28 of the TCP Window 20, is not permitted to be sent under the TCP protocol until additional acknowledgments are received.

As the destination host sends acknowledgments to the source host, the TCP Unacknowledged Data Pointer 16 moves to indicate the acknowledgment of additional packets for that connection. The beginning boundary 30 of the TCP Window 20 shifts with the TCP Unacknowledged Data Pointer 16 so that the TCP Window end boundary 28 also shifts so that additional packets may be sent for the connection. If packets in the portion 14 of the stream 10 remains unacknowledged beyond a certain time interval, the sending agent will typically resend the unacknowledged packets until an acknowledgment is received for those packets.

To initiate the sending of data, the source host typically stores the data of the datastream 10 in a buffer which can be accessed by the sending agent. One such buffer is referred to as a "circular buffer" in which data to be transmitted is copied and is typically kept there until all the data in the circular buffer 10 has been transmitted (and retransmitted as needed) and all of the data has been acknowledged as successfully received.

Circular buffers have been implemented using physical memory which stores data, usually on a short term basis, in integrated circuits, an example of which is a random access memory or RAM. Typically, data can be accessed relatively quickly from such physical memories. A host computer often has additional physical memory such as hard disks and optical disks to store data on a longer term basis. These nonintegrated circuit based memories tend to retrieve data more slowly than the physical memories.

The operating system of a computer typically utilizes a virtual memory space which is often much larger than the memory space of the short term physical memory of the computer. FIG. 2 shows an example of a virtual memory space 50 and a short term physical memory space 52. The memory space of a long term memory such as a hard drive is indicated at 54. The data to be sent in the data stream 10 may initially be stored in noncontiguous portions, that is, nonsequential memory addresses, of the various memory devices. For example, two portions indicated at 10a and 10b may be stored in the physical memory in noncontiguous portions of the physical memory space 52 while another portion indicated at 10c may be stored on the hard drive as shown in FIG. 2. The operating system of the computer uses the virtual memory address space 50 to keep track of the actual locations of the portions 10a, 10b and 10c of the datastream 10. Thus, a portion 50a of the virtual memory address space 50 is mapped to the physical memory addresses of the physical memory space 52 in which the data portion 10a is stored. In a similar fashion, a portion 50b of the virtual memory address space 50 is mapped to the physical memory addresses of the physical memory space 52 in which the data portion 10b is stored. Furthermore, a portion 50c of the virtual memory address space 50 is mapped to the physical memory addresses of the long term hard drive memory space 54 in which the data portion 10c is stored. A blank portion 50d represents an unassigned or unmapped portion of the virtual memory address space 50.

Because memory space in the physical memory is typically relatively limited, portions of the data stored in the physical memory may be copied, that is "swapped" to the hard drive or other long term memory to make room for other data in the physical memory. Thus, the data portion 10c may have been swapped from the physical memory to the hard drive. When data portion 10c was swapped to the hard drive, the virtual memory addresses of the swapped data portion are mapped to the new hard drive physical memory addresses of the hard drive memory space 54 as shown in FIG. 2 instead of the physical memory space 52 at which the portion 10c was previously stored.

FIG. 3 shows prior art operations for sending data in accordance with the Berkeley Software Design (BSD) TCP/IP Stack of the TCP/IP RFC suite. In response to a request to send a datastream 10 of data, the host which may include the computer operating system or driver or both, gathers (block 70) the various data portions 10a, 10b . . . 10n of the datastream 10 from the various locations of physical memory and long term storage. As shown in FIG. 4, the host stores the gathered datastream portions 10a, 10b . . . 10n in contiguous memory locations of the physical memory space 52. In this manner, the data of the datastream 10 is assembled for transmission.

In addition, the host through the host operating system "pins" (block 72) the physical memory locations containing the datastream 10. Pinning these memory locations prevents other applications from causing portions of the data of the datastream 10 from being swapped out to long term memory during the transmission of the datastream 10. The host sends (block 74) the physical memory addresses of the pinned physical memory locations containing the datastream 10 to the sending agent. In response, the sending agent begins sending (block 76) data packets containing the data from the pinned memory locations and begins receiving (block 78) acknowledgments from the destination host as the data packets are successfully sent and received. The sending agent continues sending (block 76) data packets and receiving (block 78) acknowledgments. Unacknowledged packets are resent (block 76) until they are acknowledged (block 78). Once all of the data packets of the data stream 10 have been successfully sent and acknowledged (block 80), the host unpins (block 82) the physical memory locations which contained the data of the datastream 10. Once unpinned, the data stored in the unpinned physical memory locations may be swapped to long term memory as needed.

Notwithstanding, there is a continued need in the art to improve the performance of memory usage in data transmission.

BRIEF DESCRIPTION OF THE DRAWINGS

Referring now to the drawings in which like reference numbers represent corresponding parts throughout:

FIG. 1 illustrates a stream of data being transmitted in accordance with the prior art TCP protocol;

FIG. 2 illustrates prior art virtual and physical memory addresses of data of a datastream stored in memory;

FIG. 4 illustrates a prior art storage of data of a datastream in a physical memory;

DETAILED DESCRIPTION OF THE ILLUSTRATED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 3:
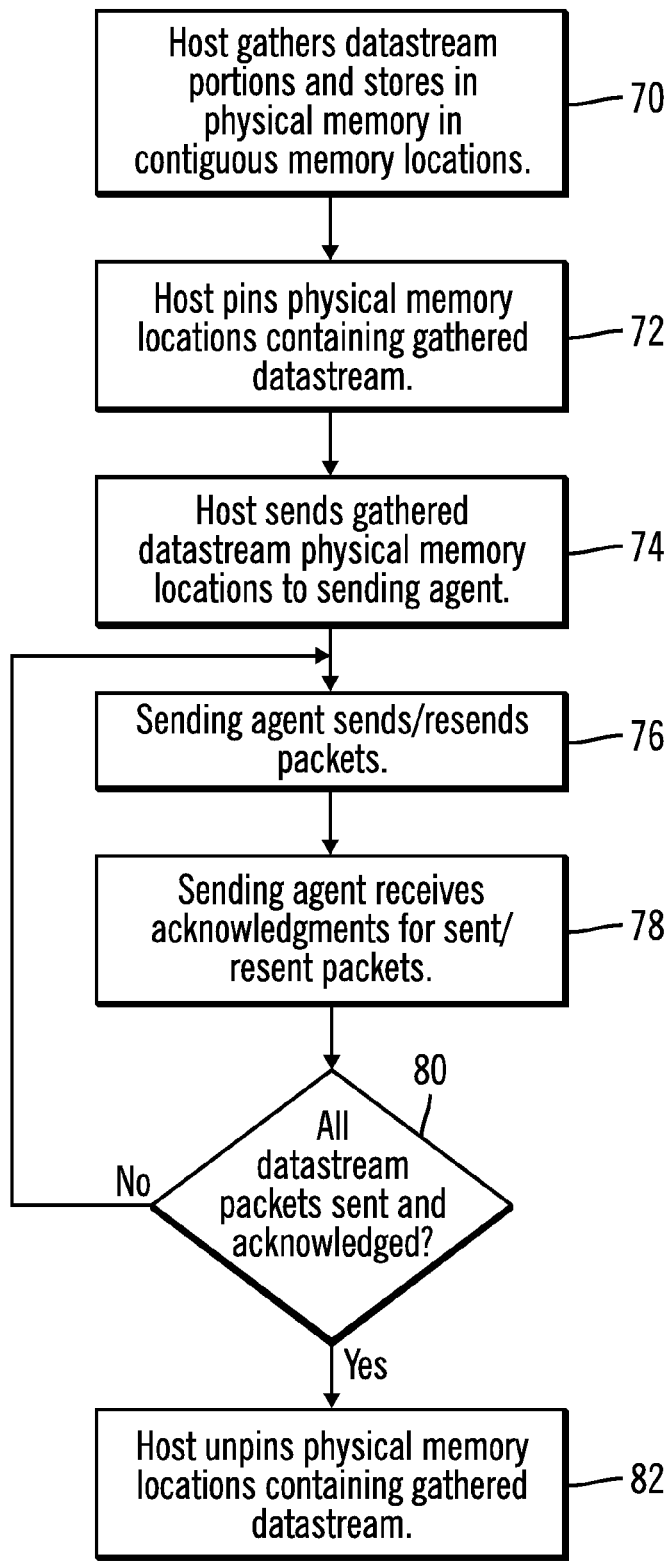
FIG. 3 illustrates a prior art operations in transmitting data through a network.
Figure 5:
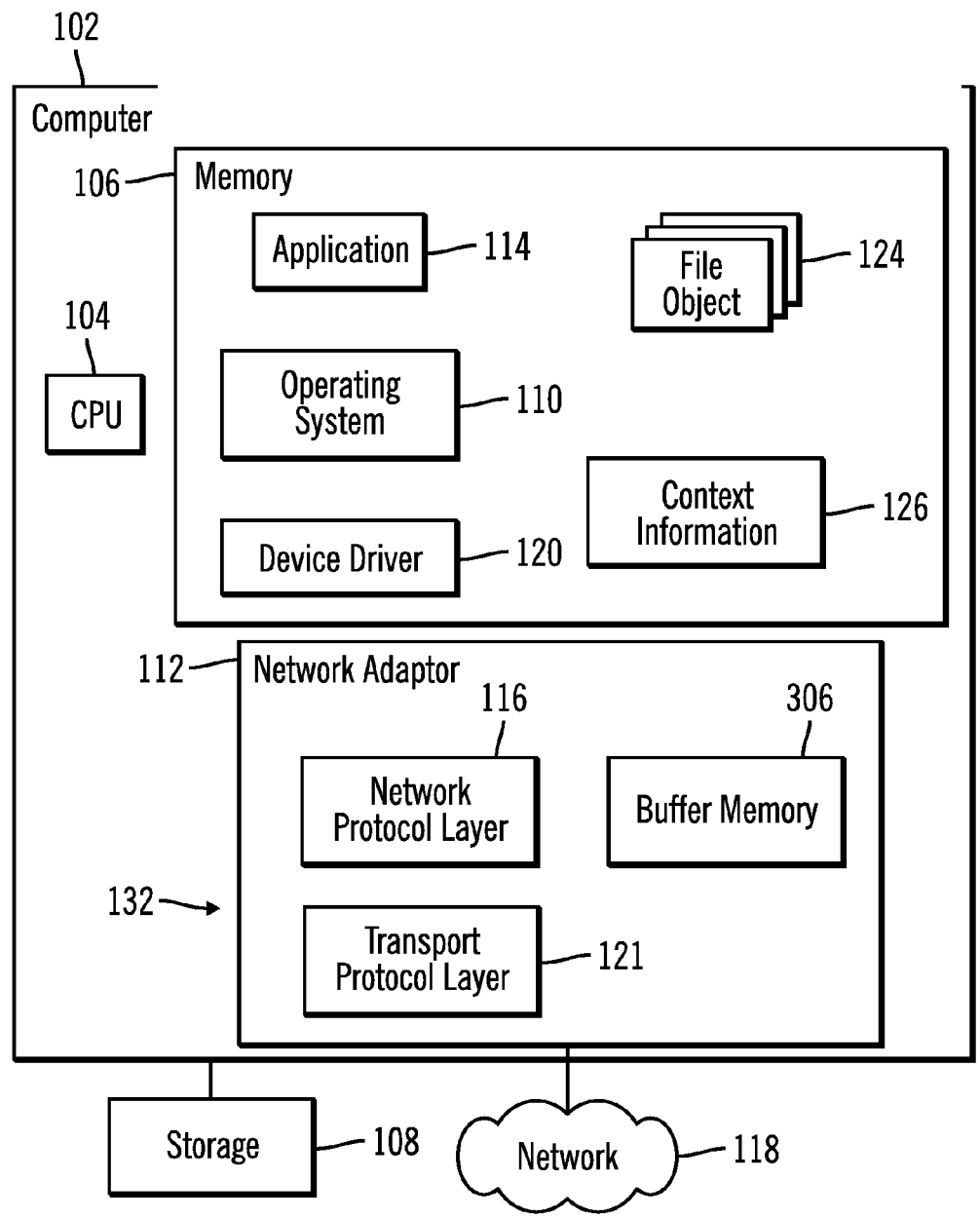
FIG. 5 illustrates one embodiment of a computing environment in which aspects of the invention are implemented.

FIG. 5 illustrates a computing environment in which aspects of the invention may be implemented. A computer 102 includes one or more a central processing units (CPU) 104 (only one is shown), a memory 106, non-volatile storage 108, an operating system 110, and a network adaptor 112. An application program 114 further executes in memory 106 and is capable of transmitting and receiving packets from a remote computer. The computer 102 may comprise any computing device known in the art, such as a mainframe, server, personal computer, workstation, laptop, handheld computer, telephony device, network appliance, virtualization device, storage controller, etc. Any CPU 104 and operating system 110 known in the art may be used. Programs and data in memory 106 may be swapped into storage 108 as part of memory management operations.

The network adaptor 112 includes a network protocol layer 116 for implementing the physical communication layer to send and receive network packets to and from remote devices over a network 118. The network 118 may comprise a Local Area Network (LAN), the Internet, a Wide Area Network (WAN), Storage Area Network (SAN), etc. Embodiments may be configured to transmit data over a wireless network or connection, such as wireless LAN, Bluetooth, etc. In certain embodiments, the network adaptor 112 and network protocol layer 116 may implement the Ethernet protocol, token ring protocol, Fibre Channel protocol, Infiniband, Serial Advanced Technology Attachment (SATA), parallel SCSI, serial attached SCSI cable, etc., or any other network communication protocol known in the art.

A device driver 120 executes in memory 106 and includes network adaptor 112 specific commands to communicate with the network adaptor 112 and interface between the operating system 110 and the network adaptor 112. In certain implementations, the network adaptor 112 includes a transport protocol layer 121 as well as the network protocol layer 116. For example, the network adaptor 112 can implement a TCP/IP offload engine (TOE), in which transport layer operations are performed within the offload engines of the transport protocol layer 121 implemented within the network adaptor 112 hardware, as opposed to the device driver 120.

The network layer 116 handles network communication and provides received TCP/IP packets to the transport protocol layer 121 to decrypt the packets if encrypted. The transport protocol layer 121 interfaces with the device driver 120 and performs additional transport protocol layer operations, such as processing the decrypted content of messages included in the packets received at the network adaptor 112 that are wrapped in a transport layer, such as TCP and/or IP, the Internet Small Computer System Interface (iSCSI), Fibre Channel SCSI, parallel SCSI transport, or any other transport layer protocol known in the art. The transport offload engine 121 can unpack the payload from the received TCP/IP packet and transfer the data to the device driver 120 to return to the application 114.

An application 114 transmitting data through the network 118 provides the data to device driver 120. The data can be sent to the transport protocol layer 121 to be packaged in a TCP/IP packet. The transport protocol layer 121 can further encrypt the packet before transmitting it over the network 118 through the network protocol layer 116.

The memory 106 further includes file objects 124, which also may be referred to as socket objects, which include information on a connection to a remote computer over the network 118. The application 114 uses the information in the file object 124 to identify the connection. The application 114 would use the file object 124 to communicate with a remote system. The file object 124 may indicate the local port or socket that will be used to communicate with a remote system, a local network (IP) address of the computer 102 in which the application 114 executes, how much data has been sent and received by the application 114, and the remote port and network address, e.g., IP address, with which the application 114 communicates. Context information 126 comprises a data structure including information the device driver 120 maintains to manage requests sent to the network adaptor 112 as described below.

In the illustrated embodiment, the CPU 104 programmed to operate by the software of memory 106 including one or more of the operating system 110, applications 114, and device drivers 120 provide a host 130 which interacts with the network adaptor 112. Accordingly, a sending agent 132 includes the transport protocol layer 121 and the network protocol layer 116 of the network interface 112. However, the sending agent 132 may be implemented with a TOE, a network interface card or integrated circuit, a driver, TCP/IP stack, a host processor or a combination of these elements.

Figure 6:
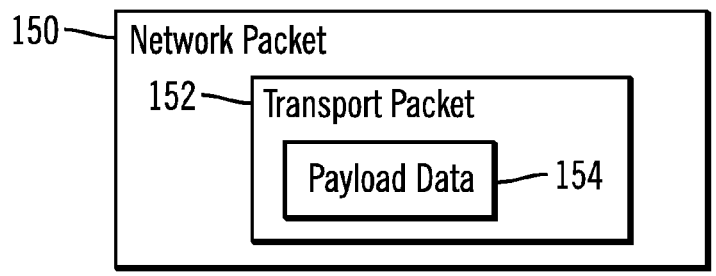
FIG. 6 illustrates a prior art packet architecture.

FIG. 6 illustrates a format of a network packet 150 received at or transmitted by the network adaptor 112. The network packet 150 is implemented in a format understood by the network protocol 114, such as encapsulated in an Ethernet frame that would include additional Ethernet components, such as a header and error checking code (not shown). A transport packet 152 is included in the network packet 150. The transport packet may 152 comprise a transport layer capable of being processed by the transport protocol driver 121, such as the TCP and/or IP protocol, Internet Small Computer System Interface (iSCSI) protocol, Fibre Channel SCSI, parallel SCSI transport, etc. The transport packet 152 includes payload data 154 as well as other transport layer fields, such as a header and an error checking code. The payload data 52 includes the underlying content being transmitted, e.g., commands, status and/or data. The operating system 110 may include a device layer, such as a SCSI driver (not shown), to process the content of the payload data 154 and access any status, commands and/or data therein.

As previously mentioned, when sending a datastream such as datastream 10, the host has previously typically stored the data of the datastream in physical memory and pinned those locations of physical memory until all the packets of the datastream have been successfully sent by the sending agent and acknowledged by the destination. As a consequence, substantial portions of physical memory can be tied up during the data transmission process.

In accordance with one embodiment which can improve management of memory resources during data transmission, the host 130 sends to the sending agent 132 the virtual memory addresses of data to be sent. As previously mentioned, the host 130 may include the operating system or a driver, or both. The sending agent 132 may be implemented with a TOE, a network interface card or integrated circuit, a driver, TCP/IP stack, a host processor or a combination of these elements. When the sending agent 132 is ready to send data in either a transmission or alternatively a retransmission, the sending agent 132 provides to the host the virtual addresses of the data it is ready to send, which can be just a portion of the entire datastream which is to be sent. In response, the host provides to the sending agent 132 the physical addresses of the requested data or the actual data itself. As a result, pinning of physical memory can be reduced or eliminated as explained in greater detail below.

Figure 7:
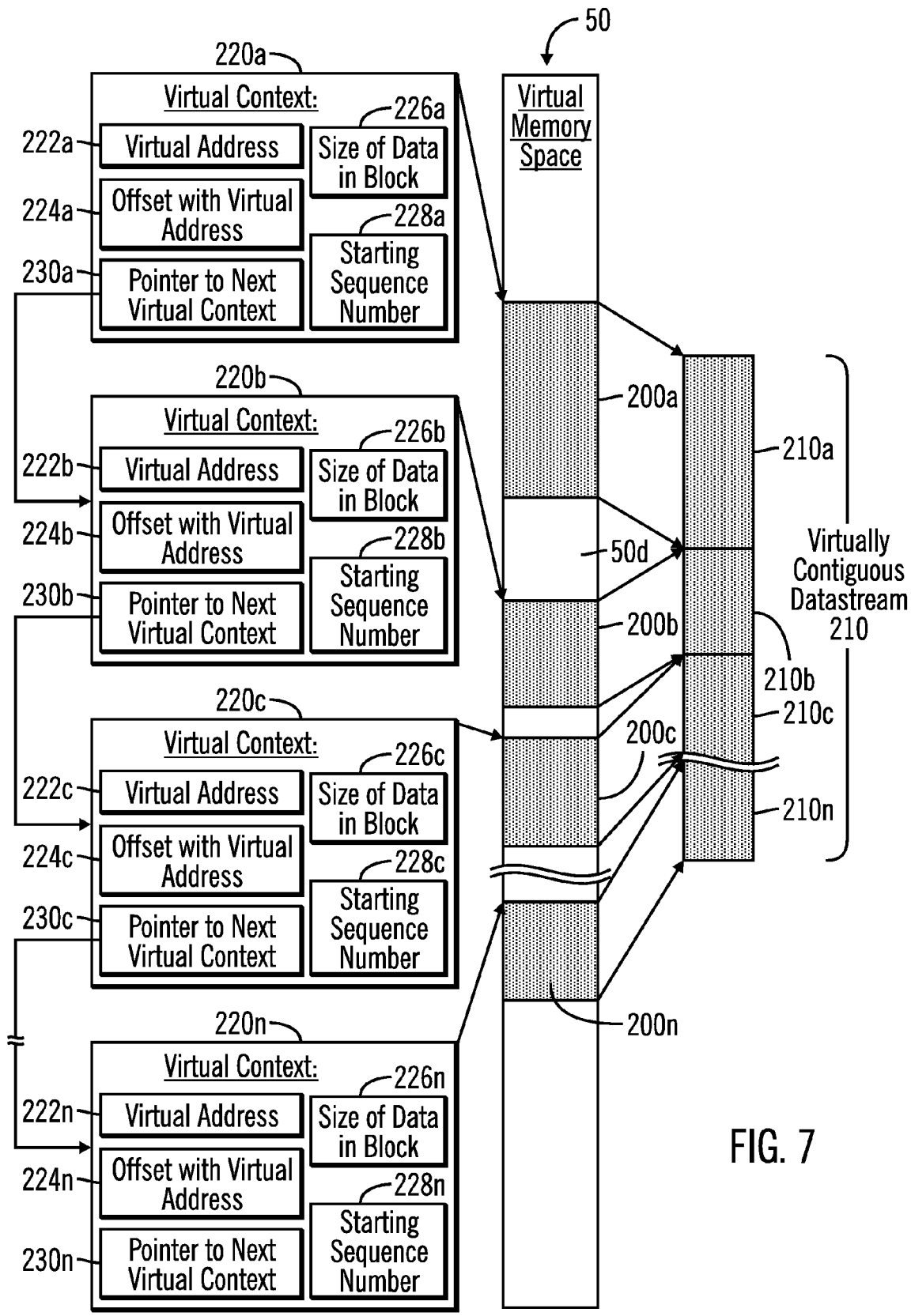
FIG. 7 illustrates one embodiment of a data structure of a virtually contiguous datastream n accordance with aspects of the invention.

FIG. 7 shows a block 200a of virtual memory address of the virtual memory space 50. Each virtual memory address of the block 200a is mapped to a plurality of physical memory locations containing a block 210a of data of a data stream 210 to be sent. The physical memory locations storing the data block 210a may be in the physical memory locations 52 or the long term physical memory locations 54. Another block 200b of virtual memory addresses is mapped to another plurality of physical memory locations containing another block 210b of the data to be sent. The physical memory locations storing the data block 210b may also be in either the physical memory locations 52 or the long term physical memory locations 54 and need not be in the same type of memory as the block 210a. Additional blocks of virtual memory addresses are mapped to physical memory locations containing the other blocks of the data of the data stream to be sent. The physical memory locations storing the other data blocks again may be in either the physical memory locations 52 or the long term physical memory locations 54 and need not all be in the same type of memory. A block 200n of virtual memory addresses is mapped to the last plurality of physical memory locations containing the last block 210n of the data of the datastream 210 to be sent.

Each block 200a, 200b . . . 200n of virtual memory addresses may be identified to the sending agent 132 in a variety of formats. FIG. 7 illustrates one example of a data structure, referred to herein as a "virtual context" which identifies a block of virtual memory addresses. In this example, each block 200a, 200b . . . 200n of virtual memory addresses is identified by an associated virtual context 220a, 220b . . . 220n, respectively. Each virtual context 220a, 220b. . . 220n has a virtual address field 222a, 222b . . . 222n which can contain the virtual address of the beginning packet of data of the associated data block 210a, 210b . . . 210n. Alternatively, the virtual address of the beginning data packet can be identified by a virtual address stored in the virtual address field 222a, 222b . . . 222n combined with an offset value stored in an Offset field 224a, 224b . . . 224n.

The size of each data block 210a . . . 210b . . . 210n is identified in a Data Size field 226a, 226b . . . 226n. Thus, in the illustrated embodiment, the size of each block of data 210a, 210b . . . 210n may vary from block to block. Alternatively, a fixed size may be appropriate for some applications. In addition, the TCP sequence number or other sending protocol sequence number of the first packet of data of the data block 210a, 210b . . . 210n is identified in a Starting Sequence Number field 228a, 228b . . . 228n.

In the illustrated embodiment, the virtual contexts 220a, 220b . . . 220n may be linked together by a Pointer field 230a, 230b . . . 230n which points to the address of the virtual memory location containing the next virtual context 220a, 220b . . . 220n of the datastream 210. Thus, for example, the Pointer field 230a of the virtual context 220a for the virtual memory address block 200a of the data block 210a, points to the address of the virtual memory location containing the next virtual context 220b for the virtual memory address block 200b of the data block 210b, the Pointer field 230b of the virtual context 220b for the virtual memory address block 200b of the data block 210b, points to the address of the virtual memory location containing the next virtual context 220c for the virtual memory address block 200c of the data block 210c, and so on.

As noted above, each block of the data blocks 210a, 210b . . . 210n may be stored in a different type of physical memory. In addition, those blocks of the data blocks 210a, 210b . . . 210n which are stored in the same memory need not be in memory locations contiguous to the memory locations of the other data blocks stored in the particular memory. Nevertheless, the linked list of virtual contexts 220a, 220b . . . 220n can be thought of as providing a virtually contiguous datastream 210 of data blocks 210a, 210b . . . 210n which need not actually be stored in contiguous memory.

Figure 8:
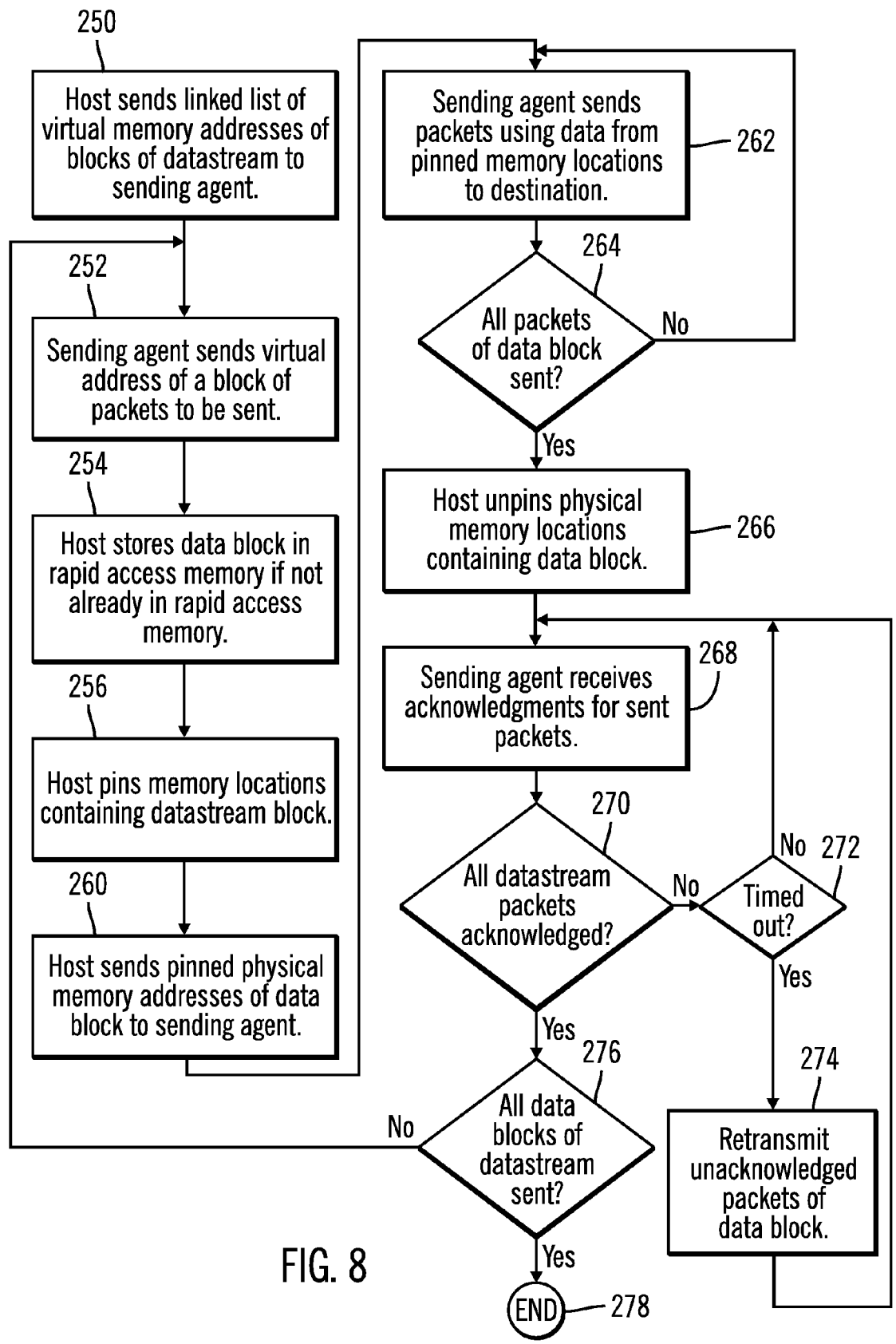
FIG. 8 illustrates one embodiment of operations performed to transmit a stream of data in accordance with aspects of the invention.

FIG. 8 shows operations of the host 130 and sending agent 132 in transmitting the datastream 210 to a destination over a network. The transmission of the datastream 210 is initiated by the host 130 sending (block 250) to the sending agent 132 the linked list of viral contexts 220a, 220b . . . 220n which identify the virtual memory address blocks 200a, 200b . . . 200n of the blocks of data 210a, 210b . . . 210n of the virtually contiguous data of the datastream 210. These virtual addresses may be sent to the sending agent 132 using known socket functions such as SO_SEND and SO_SENDMSG known to those skilled in the art. In the present application, an SO_SEND function can be used for a single block of virtual addresses and an SO_SENDMSG function for several blocks of virtual addresses.

Once the sending agent is ready to transmit a block of data packets of the datastream 210, the sending agent 132 sends (block 252) the virtual addresses of that data block to the host 130. For example, the sending agent 132 may be ready to transmit a block of data packets when that block will come within the TCP Window of a TCP connection. In the illustrated embodiment, the sending agent 132 first sends the virtual addresses of the first block of data packets, that is, the data block 210a, of the data stream 210 to the host 130. The virtual addresses of the data block 210a are identified by the virtual context 220a.

Using the virtual addresses supplied by the sending agent 132, the host 130 stores (block 254) the data block 210a in rapid access memory such as the physical memory locations 52 if it is not already in such memory locations. In addition the host 130 pins (block 256) the locations 52 of the physical memory containing the data block 210a to prevent other applications from swapping those memory location to long term memory. It is noted that in the illustrated embodiment, the host 130 can limit the physical memory pinned to that of the particular data block being sent rather than the whole datastream scheduled to be transmitted.

The host sends (block 260) to the sending agent 132, the physical memory addresses of the pinned physical memory locations 52 containing the data block 210a. The sending agent begins sending (block 262) the data packets of the data block 210a to the destination host. Once all of the data packets (block 264) of the data block 210a have been sent by the sending agent 132, the host 130 may unpin (block 266) the physical memory locations 52 containing the data block 210a.

Upon the successful receipt of data packets sent by the sending agent 132, the sending agent will receive (block 268) from the destination host acknowledgments which identify by packet sequence number, each packet successfully received by the destination host. It is noted that in the illustrated embodiment, the host 130 can unpin (block 266) the physical memory locations containing the data block 210a prior to receiving any or all of the acknowledgments from the destination host. If an acknowledgment is not received (block 270) for each sent data packet of the data block 210a, the sending agent 132, for a certain time period (block 272), will continue to receive (block 268) any additional acknowledgments which may be sent by the destination host. However, if a sent data packet is not acknowledged within a certain time period (block 272), the sending agent 132 will proceed to retransmit (block 274) the unacknowledged data packets of the data block 210a as described in greater detail below.

Once an acknowledgment has been received for all (block 270) data packets of the data block 210a, the sending agent 132 can send the next data block of the data blocks 210b . . . 210n to the destination host if all the data blocks have not yet been sent (block 276). Hence, the sending agent 132 sends the virtual addresses of the next block 210b of data packets of the data stream 210 to the host 130.

Using the virtual addresses supplied by the sending agent 132, the host 130 stores (block 254) the data block 210b in physical memory locations 52 if it is not already in rapid access memory 52 and pins (block 256) the locations 52 of the physical memory containing the data block 210b.

The host sends (block 260) to the sending agent 132, the physical memory addresses of the pinned physical memory locations containing the data block 210b. The sending agent begins sending (block 262) the data packets of the data block 210b to the destination host. Once all of the data packets (block 264) of the data block 210b have been sent by the sending agent 132, the host 130 may unpin (block 266) the physical memory locations containing the data block 210b.

If a sent data packet is not acknowledged within a certain time period (block 272), the sending agent 132 will proceed to retransmit (block 274) the unacknowledged data packets of the data block 210b. The remaining data blocks of the data stream 210 are transmitted in this fashion until all data blocks (block 276) have been successfully sent and acknowledged, and the transmission of the datastream 210 is completed (block 278).

Figure 9:
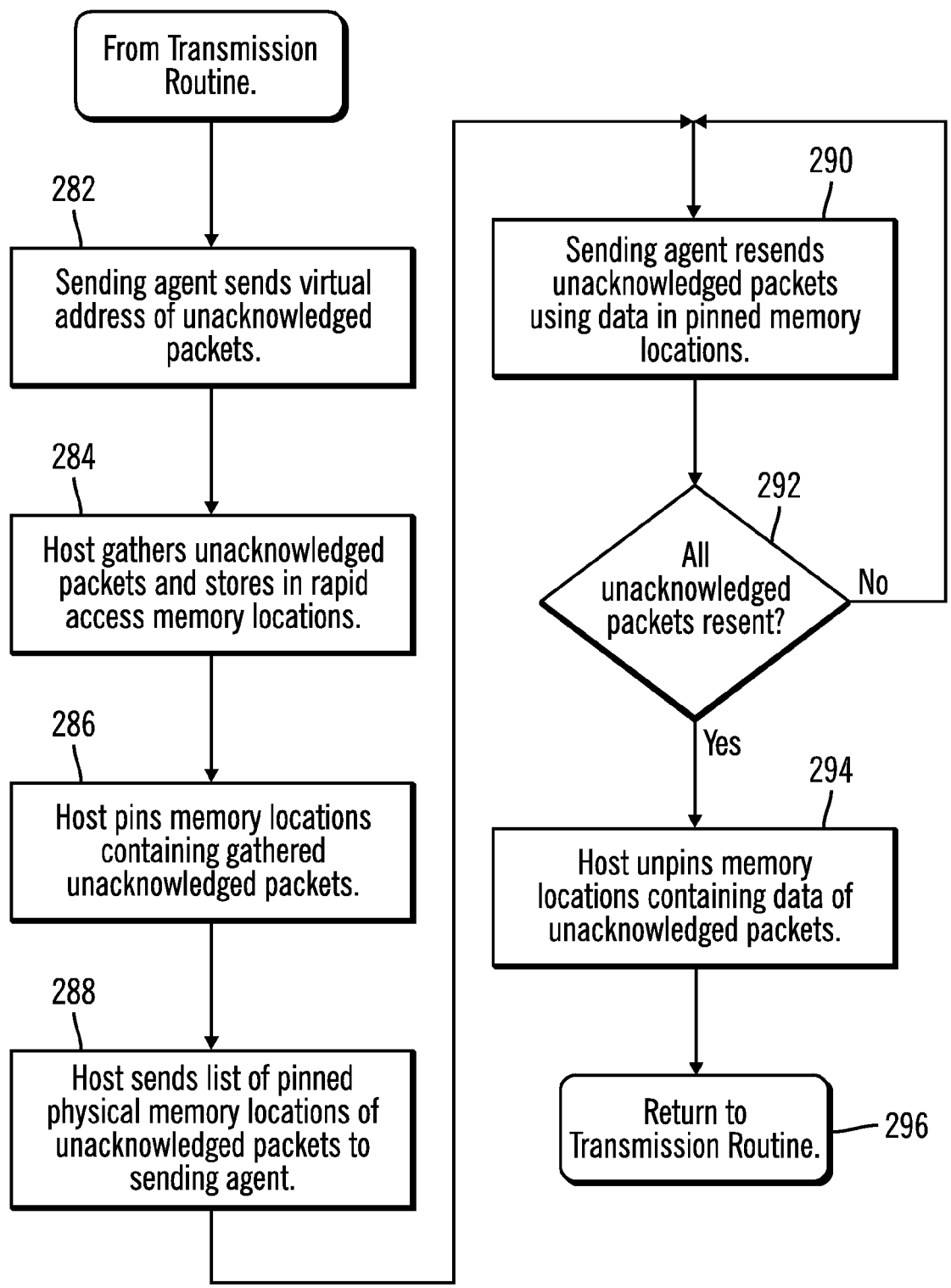
FIG. 9 illustrates one embodiment of operations performed to retransmit data of a stream of data in accordance with aspects of the invention.

FIG. 9 shows operations of the host 130 and sending agent 132 in retransmitting (block 274, FIG. 8) unacknowledged data packets of the block of data of the datastream 210 being transmitted to a destination over a network. The sending agent 132 sends (block 282) to the host 132 the virtual addresses of those data packets that were not acknowledged by the destination host within the time period of block 272 of FIG. 8.

Using the virtual addresses supplied by the sending agent 132, the host 130 gathers (block 284) the unacknowledged packets and stores the unacknowledged packets in physical memory locations 52 if it is not already in physical memory 52. In the illustrated embodiment, the unacknowledged packets may be stored in contiguous memory locations of the physical memory 52 or in noncontiguous locations. In addition the host 130 pins (block 286) the locations of the physical memory 52 containing the unacknowledged packets to prevent other applications from swapping those memory locations to long term memory.

The host 130 sends (block 288) to the sending agent 132, the physical memory addresses of the pinned physical memory locations containing the data of the unacknowledged packets of the data block being sent. The sending agent begins resending (block 290) the unacknowledged data packets to the destination host. Once all of the unacknowledged data packets (block 292) have been resent by the sending agent 132, the host 130 may unpin (block 294) the physical memory locations containing the unacknowledged packets of the data block being resent.

Control returns (block 296) to the transmission routine of FIG. 8 to receive (block 268) the acknowledgments from the destination host. It is noted that in the illustrated embodiment, the host 130 can unpin (block 294) the physical memory locations containing the unacknowledged data packets prior to receiving acknowledgments from the destination host. If a resent data packet of the previously unacknowledged data packets is not acknowledged within a certain time period (block 272), the sending agent 132 will proceed to retransmit (block 274) again the unacknowledged data packets of the data block being transmitted in the manner described above in connection with FIG. 9.

Figure 10:
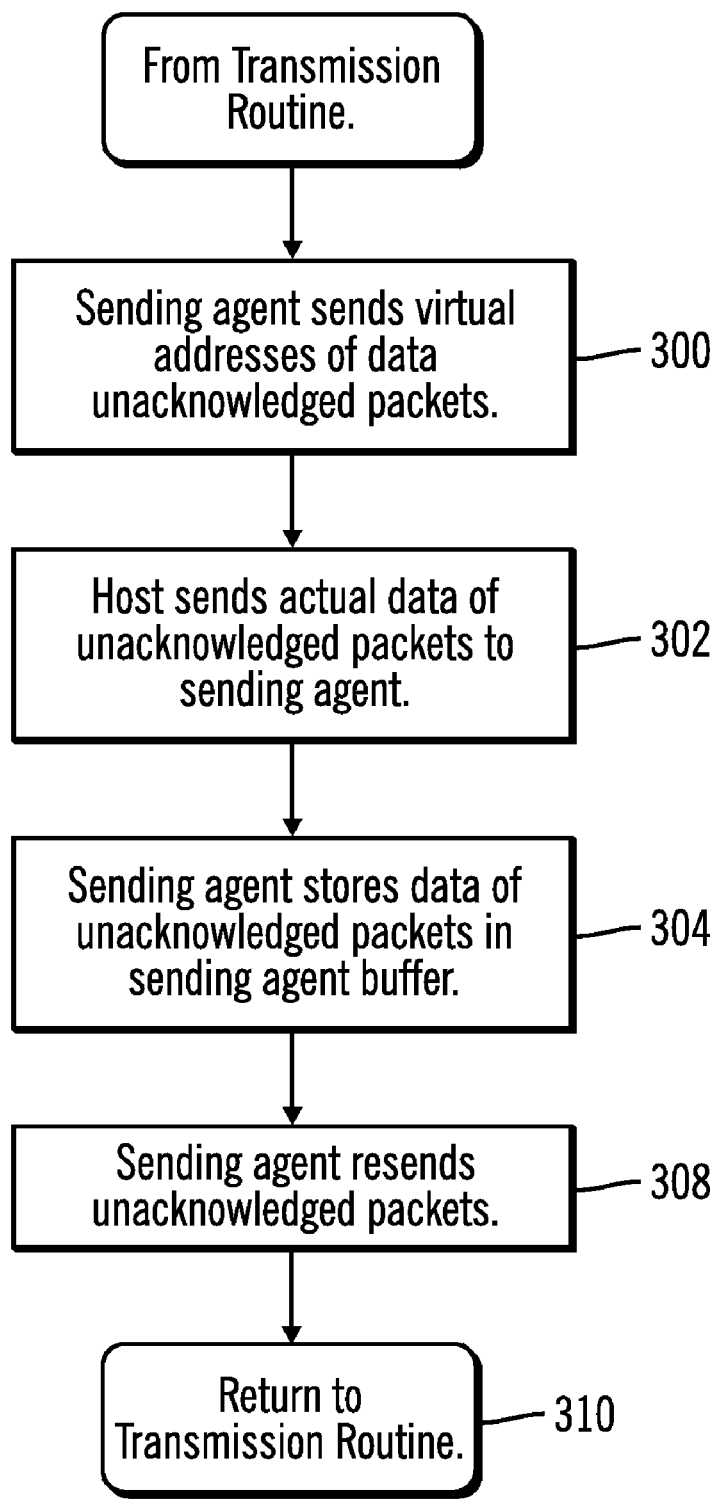
FIG. 10 illustrates another embodiment of operations performed to retransmit data of a stream of data in accordance with aspects of the invention.

FIG. 10 shows operations in accordance with an alternative embodiment, of the host 130 and sending agent 132 in retransmitting unacknowledged data packets of the block of data of the datastream 210 being transmitted to a destination over a network. In the same manner as the operations of FIG. 9, the sending agent 132 sends (block 300) to the host 132 the virtual addresses of those data packets that were not acknowledged by the destination host within the time period of block 272 of FIG. 8.

Using the virtual addresses supplied by the sending agent 132, the host 130 gathers the unacknowledged packets and rather than sending the physical memory addresses of the unacknowledged packets, the host 130 instead sends (block 302) the actual data to the sending agent 132 which stores (block 304) the data of the unacknowledged packets in a buffer memory 306 (FIG. 5) of the network interface 112.

The sending agent begins sending (block 308) the unacknowledged data packets using the data from the buffer 306 to the destination host. Control returns (block 310) to the transmission routine of FIG. 8 to receive (block 268) the acknowledgments from the destination host. If a sent data packet of the previously unacknowledged data packets is not acknowledged within a certain time period (block 272), the sending agent 132 will proceed to retransmit (block 274) the unacknowledged data packets of the data block being transmitted in one or more of the manners described above in connection with FIG. 9 or 10.

In the examples of FIGS. 8-10 discussed above, the transmission of a data block 210*a*, 210*b* . . . 210*n* at a time was discussed. It is appreciated that the transmission of data blocks by the sending agent need not be limited to just one data block outstanding at a time. Depending upon the application, several or more data blocks can be sent without receiving any acknowledgments. Thus in a TCP context, the sending agent can send data up to the TCP Window (FIG. 1) and this data can span several data blocks, pointed to by different Virtual Contexts without receiving any acknowledgments. The sending agent keeps track of how much data it can send without receiving acknowledgments using the TCP Next Data Pointer 22 and the value of the TCP send Window 20 as discussed above.

Figure 11:
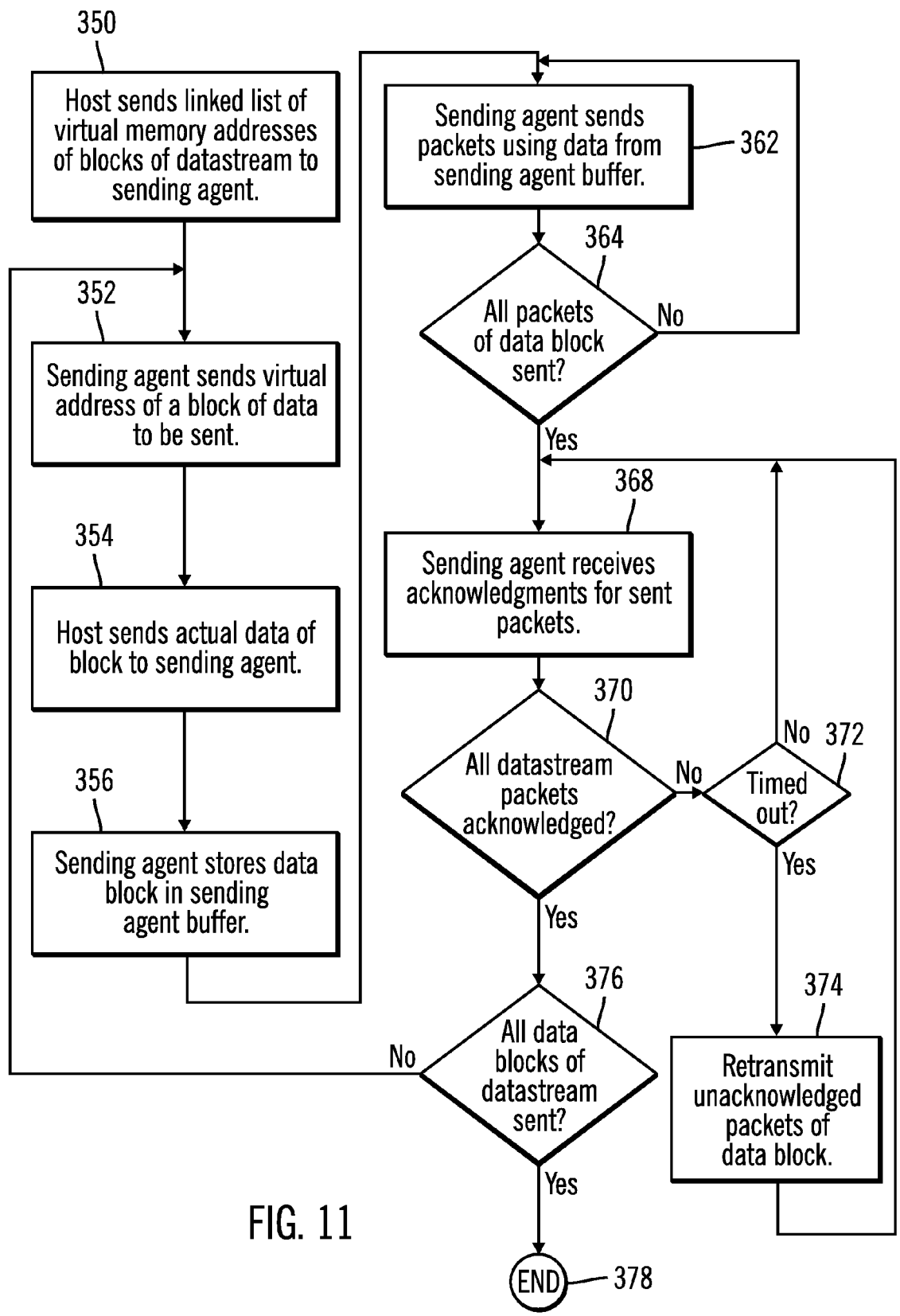
FIG. 11 illustrates another embodiment of operations performed to transmit a stream of data in accordance with aspects of the invention.

FIG. 11 shows operations in accordance with an alternative embodiment, of the host 130 and sending agent 132 in transmitting the datastream 210 to a destination over a network. In the same manner as the operations of FIG. 8, the transmission of the datastream 210 is initiated by the host 130 sending (block 350) to the sending agent 132 the linked list of virtual contexts 220*a*, 220*b* . . . 220*n* which identify the virtual memory address blocks 200*a*, 200*b* . . . 200*n* of the blocks of data 210*a*, 210*b* . . . 210*n* of the virtually contiguous datastream 210. Once the sending agent is ready to transmit a block of data packets of the datastream 210, the sending agent 132 sends (block 352) the virtual addresses of that data block to the host 132.

Using the virtual addresses supplied by the sending agent 132, the host 130 rather than sending physical memory addresses of the data block, instead sends (block 354) the data of the block to the sending agent 132 which stores (block 356) the data of the block in the buffer memory 306 of the network interface 112.

The sending agent begins sending (block 362) the data packets of the data block 210*a* from the sending agent buffer 306 to the destination host until all of the data packets (block 364) of the data block 210 have been sent by the sending agent 132. Upon the successful receipt of data packets sent by the sending agent 132, the sending agent will receive (block 368) from the destination host acknowledgments which identify by packet sequence number, each packet successfully received by the destination host. If an acknowledgment is not received (block 370) for each sent data packet of the data block 210, the sending agent 132, for a certain time period (block 372), will continue to receive (block 368) any additional acknowledgments which may be sent by the destination host. However, if a sent data packet is not acknowledged within the time period (block 372), the sending agent 132 will proceed to retransmit (block 374) the unacknowledged data packets of the data block 210 in accordance with a retransmission procedure such as one or more of the retransmission operations described in connection with FIGS. 9 and 10.

Once an acknowledgment has been received for all (block 370) data packets of the data block 210*a*, the sending agent 132 can send the next data block of the data blocks 210*b*. . . 210*n* to the destination host if all the data blocks have not yet been sent (block 376). If not, the sending agent 132 sends (block 352) the virtual addresses of the next block of data packets of the data stream 210 to the host 130. Once all the data blocks 210*a*, 210*b* . . . 210*n* have been successfully sent and acknowledged (block 376), the datastream 10 will have been successfully sent (block 378).

It is appreciated that in response to the virtual addresses provided by the sending agent, the host 130 can identify to the sending agent the data packets addressed by those virtual addresses in a variety of manners. For example, FIGS. 8 and 9 describe transmission and retransmission operations in which the host 130 using the virtual addresses supplied by the sending agent 132, pins the locations 52 of the physical memory containing the data packets addressed by the virtual addresses and sends to the sending agent 132, the physical memory addresses of the pinned physical memory locations containing the data packets. By comparison, FIGS. 11 and 10 describe transmission and retransmission operations in which the host 130 using the virtual addresses supplied by the sending agent 132, identifies the data by sending the actual data addressed by the virtual addresses to the sending agent 132 to be stored in a sending agent buffer. It is appreciated that host 130 can identify the data packets addressed by the virtual addresses supplied by the sending agent in still other techniques.

Figure 12:
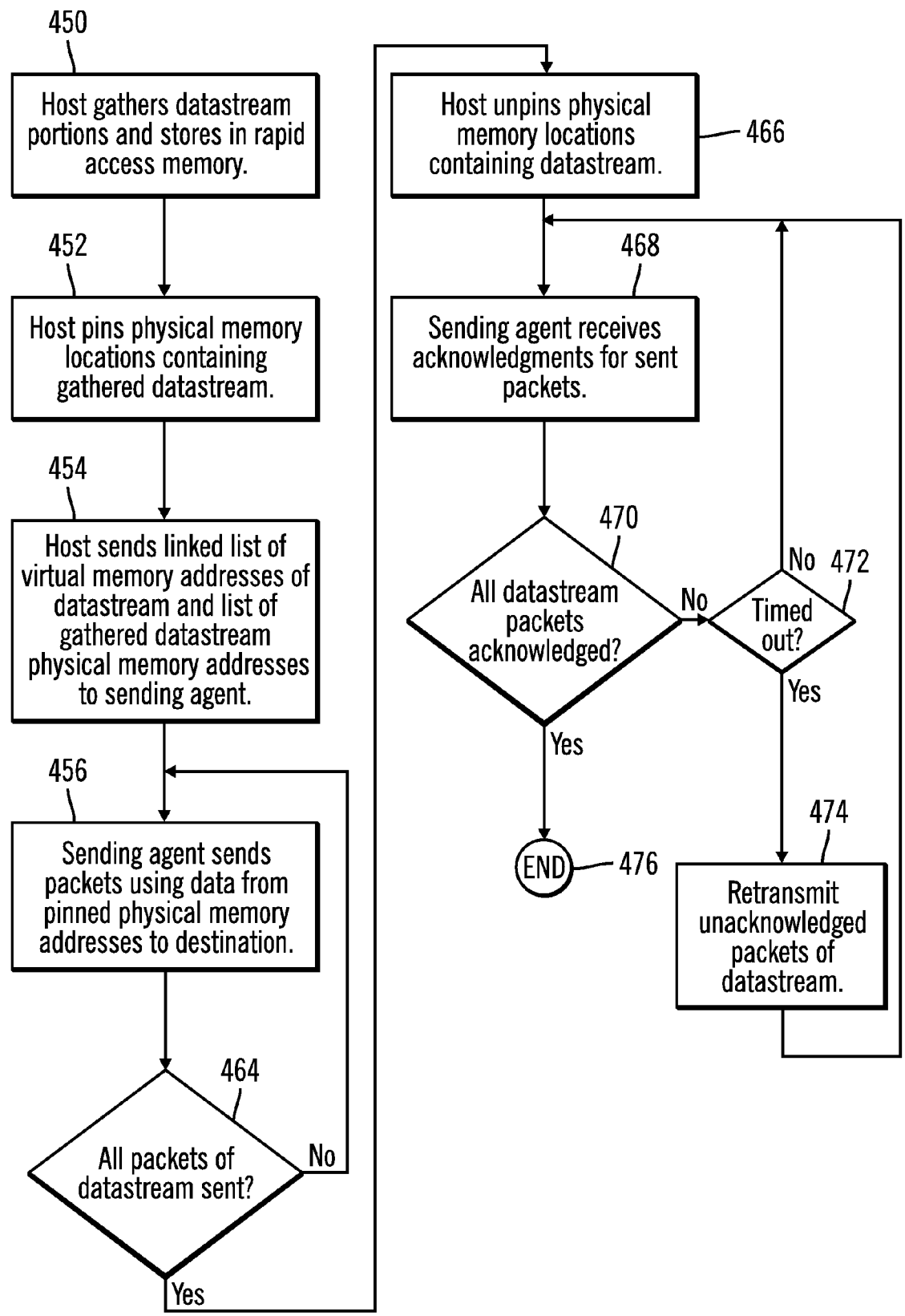
FIG. 12 illustrates still another embodiment of operations performed to transmit a stream of data in accordance with aspects of the invention.

FIG. 12 shows operations in accordance with yet another embodiment of the host 130 and sending agent 132 in transmitting the datastream 210 to a destination over a network. The transmission of the datastream 210 is initiated by the host 130 gathering (block 450) and storing the packets of the datastream 210 in the physical memory locations 52 if not already stored in physical memory. In the illustrated embodiment, the datastream 210 may be stored in contiguous memory locations of the physical memory locations 52 or in noncontiguous locations. In addition the host 130 pins (block 452) the locations of the physical memory 52 containing the datastream 210 to prevent other applications from swapping those memory locations to long term memory.

The host 130 sends (block 454) to the sending agent 132, the physical memory addresses of the pinned physical memory locations containing the datastream 210 being sent. In addition, the host 130 sends to the sending agent 132 the linked list of virtual contexts 220a, 220b . . . 220n which identify the virtual memory address blocks 200a, 200b . . . 200n of the blocks of data 210a, 210b . . . 210n of the virtually contiguous datastream 210.

The sending agent 132 begins sending (block 456) the data packets of the datastream 210 to the destination host using the data from the pinned physical memory locations of the rapid access memory locations 52. Once all of the data packets (block 464) of the datastream have been sent by the sending agent 132, the host 130 may unpin (block 466) the physical memory locations containing the datastream 210.

Upon the successful receipt of data packets sent by the sending agent 132, the sending agent will receive (block 468) from the destination host acknowledgments which identify by packet sequence number, each packet successfully received by the destination host. If an acknowledgment is not received (block 470) for each sent data packet of the data stream 210, the sending agent 132, for a certain time period (block 472), will continue to receive (block 468) any additional acknowledgments which may be sent by the destination host. However, if a sent data packet is not acknowledged within the time period (block 472), the sending agent 132 will proceed to retransmit (block 474) the unacknowledged data packets of the datastream 210 in accordance with a retransmission procedure such as the operations described in FIG. 9 or 10. Once an acknowledgment has been received for all (block 470) data packets of the datastream 210, the datastream 10 will have been successfully sent (block 476).

ADDITIONAL EMBODIMENT DETAILS

The described techniques for managing memory for data transmission through a network may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, certain operations were described as being performed by the operating system 110, device driver 120, or the network interface 112. In alterative embodiments, operations described as performed by one of these may be performed by one or more of the operating system 110, device driver 120, or the network interface 112. For example, pinning and unpinning operations described as being performed by the host 130 may be performed by the sending agent 132.

In the described implementations, a transport protocol layer 121 was implemented in the network adaptor 112 hardware. In alternative implementations, the transport protocol layer may be implemented in the device driver or host memory 106.

In the described embodiments, the packets are transmitted from a network adaptor card to a remote computer over a network. In alternative embodiments, the transmitted and received packets processed by the protocol layers or device driver may be transmitted to a separate process executing in the same computer in which the device driver and transport protocol driver execute. In such embodiments, the network card is not used as the packets are passed between processes within the same computer and/or operating system.

In certain implementations, the device driver and network adaptor embodiments may be included in a computer system including a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative implementations, the network adaptor embodiments may be included in a system that does not include a storage controller, such as certain hubs and switches.

In certain implementations, the device driver and network adaptor embodiments may be implemented in a computer system including a video controller to render information to display on a monitor coupled to the computer system including the device driver and network adaptor, such as a computer system comprising a desktop, workstation, server, mainframe, laptop, handheld computer, etc. Alternatively, the network adaptor and device driver embodiments may be implemented in a computing device that does not include a video controller, such as a switch, router, etc.

In certain implementations, the network adaptor may be configured to transmit data across a cable connected to a port on the network adaptor. Alternatively, the network adaptor embodiments may be configured to transmit data over a wireless network or connection, such as wireless LAN, Bluetooth, etc.

The illustrated logic of FIGS. 8-12 show certain events occurring in a certain order. In alternative embodiments, certain operations may be performed in a different order, modified or removed. Morever, steps may be added to the above described logic and still conform to the described embodiments. Further, operations described herein may occur sequentially or certain operations may be processed in parallel. Yet further, operations may be performed by a single processing unit or by distributed processing units.

FIG. 7 illustrates information used to identify virtual addresses. In alternative implementation, these data structures may include additional or different information than illustrated in the figures.

Figure 13:
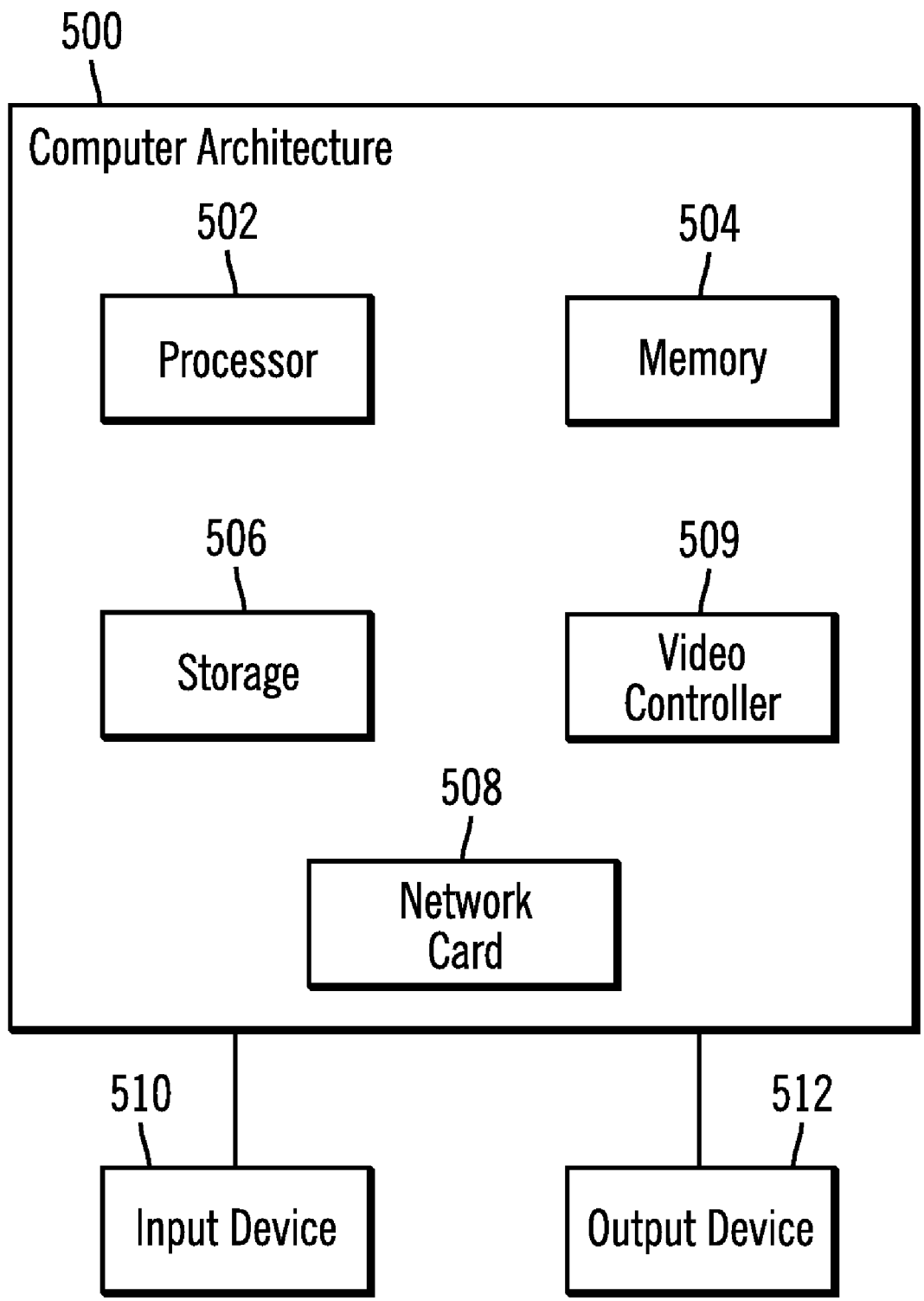
FIG. 13 illustrates an architecture that may be used with the described embodiments.

FIG. 13 illustrates one implementation of a computer architecture 500 of the network components, such as the hosts and storage devices shown in FIG. 5. The architecture 500 may include a processor 502 (e.g., a microprocessor), a memory 504 (e.g., a volatile memory device), and storage 506 (e.g., a non-volatile storage, such as magnetic disk drives, optical disk drives, a tape drive, etc.). The storage 506 may comprise an internal storage device or an attached or network accessible storage. Programs in the storage 506 are loaded into the memory 504 and executed by the processor 502 in a manner known in the art. The architecture further includes a network card 508 to enable communication with a network, such as an Ethernet, a Fibre Channel Arbitrated Loop, etc. Further, the architecture may, in certain embodiments, include a video controller 509 to render information on a display monitor, where the video controller 509 may be implemented on a video card or integrated on integrated circuit components mounted on the motherboard. As discussed, certain of the network devices may have multiple network cards. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The network adaptor 508 may be implemented on a network card, such as a Peripheral Component Interconnect (PCI) card or some other I/O card, or on integrated circuit components mounted on the motherboard.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for sending data from a source to a destination, comprising:
   a host of the source providing to a sending agent of the source, virtual memory addresses of data to be sent to a destination wherein the data is stored in a plurality of unpinned physical locations of the source, each location having a physical address and a virtual memory address which is mapped to the physical address and wherein the physical locations include locations of a first memory and locations of a second memory;
   the sending agent providing to the host of the source at least some of the virtual memory addresses of the data to be sent to the destination;
   the host of the source identifying to the sending agent the data addressed by the virtual memory addresses provided by the sending agent wherein the host identifying data comprises the host providing to the sending agent the physical addresses of the locations containing the data addressed by the virtual memory addresses provided by the sending agent, and the data identified by the host is stored in the first memory and the physical memory addresses provided by the host are physical memory locations of the first memory containing the data addressed by the virtual addresses provided by the sending agent; and
   the sending agent sending the identified data to the destination;
   the method further comprising:
      pinning the physical memory locations of the first memory provided by the host to the sending agent to prevent the data addressed by the virtual addresses provided by the sending agent from being swapped to the second memory;
      the sending agent retrieving from the pinned physical memory locations of the first memory, the data addressed by the virtual addresses provided by the sending agent; and
      unpinning the pinned physical memory locations of the first memory after the sending agent sends to the destination the data addressed by the virtual addresses provided by the sending agent.

2. The method of claim 1 wherein said method further comprises the sending agent storing the data received from the host in a buffer of the sending agent.

3. The method of claim 1 further comprising receiving from the destination an acknowledgment for data successfully sent by the sending agent and received by the destination; wherein the virtual memory addresses provided by the sending agent to the host are the virtual addresses of data sent by the sending agent to the destination but not acknowledged as successfully received by the destination.

4. The method of claim 1 further comprising:
   receiving from the destination an acknowledgment for data successfully sent by the sending agent and received by the destination;
   the sending agent providing to the host the virtual addresses of data sent by the sending agent to the destination but not acknowledged as successfully received by the destination;
   the host identifying to the sending agent the unacknowledged data addressed by the virtual memory addresses provided by the sending agent; and
   the sending agent resending the identified unacknowledged data to the destination.

5. The method of claim 1 wherein the host providing virtual addresses to the sending agent includes the host providing to the sending agent at least one data structure which includes in an address field containing the virtual address of one of a plurality of memory locations storing a block of data to be sent to the destination, a size field containing a value representing the size of the block of data; and a sequence number field containing a value representing a packet sequence number associated with data within the block of data.

6. The method of claim 1 wherein the host providing virtual addresses to the sending agent includes the host providing to the sending agent a plurality of data structures, wherein each data structure includes in an address field, the virtual address of one of a plurality of memory locations storing a block of data to be sent to the destination, a size field containing a value representing the size of the block of data, a sequence number field containing a value representing the packet sequence number associated with data within the block of data; and a link field containing the virtual address of another data structure of the plurality of data structures.

7. The method of claim 1 wherein the sending by the sending agent of the identified data to the destination includes sending the identified data in data packages over a network to the destination in accordance with at least a transport protocol.

8. A system adapted to communicate with a destination, comprising:
    memory;
    a processor coupled to the system memory;
    an operating system executable by the processor in memory;
    a network adaptor;
    data storage;
    a data storage controller adapted to manage Input/Output (I/O) access to the data storage; and
    a device driver executable by the processor in the memory,
    wherein the memory and the data storage each comprise physical locations adapted to store data, each location having a physical address and a virtual address which is mapped to the physical address; and
    wherein at least one of the operating system and device driver is adapted to provide a host and at least one of the device driver and the network adaptor is adapted to provide a sending agent wherein:
        (i) the host provides to the sending agent, virtual memory addresses of data to be sent to a destination wherein the data is stored in a plurality of unpinned physical locations of the memory,
        (ii) the sending agent provides to the host at least some of the virtual memory addresses of the data to be sent to the destination;
        (iii) the host identifies to the sending agent the data addressed by the virtual memory addresses provided by the sending agent, wherein the host identifying data comprises the host providing to the sending agent the physical addresses of the locations containing the data addressed by the virtual memory addresses provided by the sending agent and wherein the data identified by the host is stored in the memory and the physical addresses provided by the host are physical locations of the memory containing the data addressed by the virtual addresses provided by the sending agent; and
        (iv) the sending agent sends the identified data to the destination;
    wherein the host is further adapted to pin the physical memory locations of the memory provided by the host to the sending agent to prevent the data addressed by the virtual addresses provided by the sending agent from being swapped to the data storage;
    wherein the sending agent is further adapted to retrieve from the pinned physical memory locations of the memory, the data addressed by the virtual addresses provided by the sending agent; and
    at least one of the sending agent and the host is further adapted to unpin the pinned physical memory locations of the memory after the sending agent sends to the destination the data addressed by the virtual addresses provided by the sending agent.

9. The system of claim 8 wherein the system further comprises a buffer and wherein the sending agent is further adapted to store the data received from the host in the buffer.

10. The system of claim 8 wherein the sending agent is further adapted to receive from the destination an acknowledgment for data successfully sent by the sending agent and received by the destination; and wherein the virtual memory addresses provided by the sending agent to the host are the virtual addresses of data sent by the sending agent to the destination but not acknowledged as successfully received by the destination.

11. The system of claim 8 wherein the sending agent is further adapted to:
    receive from the destination an acknowledgment for data successfully sent by the sending agent and received by the destination; and
    provide to the host the virtual addresses of data sent by the sending agent to the destination but not acknowledged as successfully received by the destination;
    wherein the host is further adapted to identify to the sending agent the unacknowledged data addressed by the virtual memory addresses provided by the sending agent; and
    wherein the sending agent is further adapted to resend the identified unacknowledged data to the destination.

12. The system of claim 8 wherein the host providing virtual addresses to the sending agent includes the host providing to the sending agent at least one data structure which includes an address field containing the virtual address of one of a plurality of locations storing a block of data to be sent to the destination, a size field containing a value representing the size of the block of data; and a sequence number field containing a value representing a packet sequence number associated with data within the block of data.

13. The system of claim 8 wherein the host providing virtual addresses to the sending agent includes the host providing to the sending agent a plurality of data structures, wherein each data structure includes an address field containing the virtual address of one of a plurality of memory locations storing a block of data to be sent to the destination, a size field containing a value representing the size of the block of data, a sequence number field containing a value representing the packet sequence number associated with data within the block of data; and a link field containing the virtual address of another data structure of the plurality of data structures.

14. The system of claim 8 the sending agent in sending the identified data to the destination is adapted to send the identified data in data packages over a network to the destination in accordance with at least a transport protocol.

15. An article of manufacture for sending data from a source to a destination, the operations comprising:
    a host of the source providing to a sending agent of the source, virtual memory addresses of data to be sent to a destination wherein the data is stored in a plurality of unpinned physical locations of the source, each location having a physical address and a virtual memory address which is mapped to the physical address, and wherein the physical locations include locations of a first memory and locations of a second memory;
    the sending agent providing to the host of the source at least some of the virtual memory addresses of the data to be sent to the destination;
    the host of the source identifying to the sending agent the data addressed by the virtual memory addresses provided by the sending agent and wherein the host identifying data comprises the host providing to the sending agent the physical addresses of the locations containing the data addressed by the virtual memory addresses provided by the sending agent, and the data identified by the host is stored in the first memory and the physical memory addresses provided by the host are physical memory locations of the first memory containing the data addressed by the virtual addresses provided by the sending agent; and the sending agent sending the identified data to the destination;

the operations further comprising:
  pinning the physical memory locations of the first memory provided by the host to the sending agent to prevent the data addressed by the virtual addresses provided by the sending agent from being swarmed to the second memory;
  the sending agent retrieving from the pinned physical memory locations of the first memory, the data addressed by the virtual addresses provided by the sending agent; and
  unpinning the pinned physical memory locations of the first memory after the sending agent sends to the destination the data addressed by the virtual addresses provided by the sending agent.

16. The article of manufacture of claim 15 wherein said operations further comprise the sending agent storing the data received from the host in a buffer of the sending agent.

17. The article of manufacture of claim 15 wherein the operations further comprise receiving from the destination an acknowledgment for data successfully sent by the sending agent and received by the destination; wherein the virtual memory addresses provided by the sending agent to the host are the virtual addresses of data sent by the sending agent to the destination but not acknowledged as successfully received by the destination.

18. The article of manufacture of claim 15 wherein the operations further comprise:

receiving from the destination an acknowledgment for data successfully sent by the sending agent and received by the destination;
  the sending agent providing to the host the virtual addresses of data sent by the sending agent to the destination but not acknowledged as successfully received by the destination;
  the host identifying to the sending agent the unacknowledged data addressed by the virtual memory addresses provided by the sending agent; and
  the sending agent resending the identified unacknowledged data to the destination.

19. The article of manufacture of claim 15 wherein the host providing virtual addresses to the sending agent includes the host providing to the sending agent at least one data structure which includes in an address field containing the virtual address of one of a plurality of memory locations storing a block of data to be sent to the destination, a size field containing a value representing the size of the block of data; and a sequence number field containing a value representing a packet sequence number associated with data within the block of data.

20. The article of manufacture of claim 15 wherein the host providing virtual addresses to the sending agent includes the host providing to the sending agent a plurality of data structures, wherein each data structure includes in an address field, the virtual address of one of a plurality of memory locations storing a block of data to be sent to the destination, a size field containing a value representing the size of the block of data, a sequence number field containing a value representing the packet sequence number associated with data within the block of data; and a link field containing the virtual address of another data structure of the plurality of data structures.

21. The article of manufacture of claim 15 wherein the sending by the sending agent of the identified data to the destination includes sending the identified data in data packages over a network to the destination in accordance with at least a transport protocol.

* * * * *

UNITED STATES PATENT AND TRADEMARK OFFICE
CERTIFICATE OF CORRECTION

| | | |
|---|---|---|
| PATENT NO. | : 7,496,690 B2 | Page 1 of 1 |
| APPLICATION NO. | : 10/683941 | |
| DATED | : February 24, 2009 | |
| INVENTOR(S) | : H. T. Beverly et al. | |

It is certified that error appears in the above-identified patent and that said Letters Patent is hereby corrected as shown below:

In the Claims

Column 17, Line 17, Claim 15, "swarmed" should read --swapped--.

Signed and Sealed this
Ninth Day of September, 2014

Michelle K. Lee
*Deputy Director of the United States Patent and Trademark Office*